United States Patent [19]

Neville

[11] 3,708,651
[45] Jan. 2, 1973

[54] ELECTRIC SAUNA HEATER
[75] Inventor: John Leo Neville, Cannon Falls, Minn.
[73] Assignee: Micro Metals, Inc., Red Wing, Minn.
[22] Filed: March 12, 1969
[21] Appl. No.: 806,362

[52] U.S. Cl. .................... 219/365, 4/160, 126/344, 128/367, 219/275, 219/368, 219/378, 219/530
[51] Int. Cl. ............................................. A61h 33/06
[58] Field of Search ..................... 219/365–368, 370, 219/271–276, 362, 378, 341, 530, 540; 4/160–164; 126/344; 122/40; 128/367

[56] References Cited

UNITED STATES PATENTS

| | | |
|---|---|---|
| 2,654,018 | 9/1953 | Sandberg ............................. 219/365 |
| 2,709,214 | 5/1955 | Engdahl ............................... 219/365 |
| 3,147,367 | 9/1964 | Magnusson .......................... 219/365 |

FOREIGN PATENTS OR APPLICATIONS

| | | |
|---|---|---|
| 732,713 | 4/1966 | Canada ................................. 219/365 |
| 884,956 | 12/1961 | Great Britain ....................... 219/365 |
| 88,578 | 1/1957 | Norway ................................ 219/365 |
| 256,963 | 3/1949 | Switzerland ......................... 219/365 |

Primary Examiner—A. Bartis
Attorney—Robert M. Dunning

[57] ABSTRACT

An electric sauna heater includes an outer tubular shell and a concentric inner tubular shell supported in spaced relation. A heating element encircles the inner shell in contact therewith. A partition extends across the inner shell, and the area above the partition forms a receptacle for rocks or other heat retaining elements. An open bottomed air chamber is formed within the inner shell below the partition. A frusto-conical baffle within the lower end of the outer shell directs air toward the lower end of the air chamber in inner sleeve. A ring-shaped baffle extends outwardly from the inner shell above the outer shell in spaced relation thereto to deflect heated air radially outwardly.

4 Claims, 5 Drawing Figures

PATENTED JAN 2 1973
3,708,651
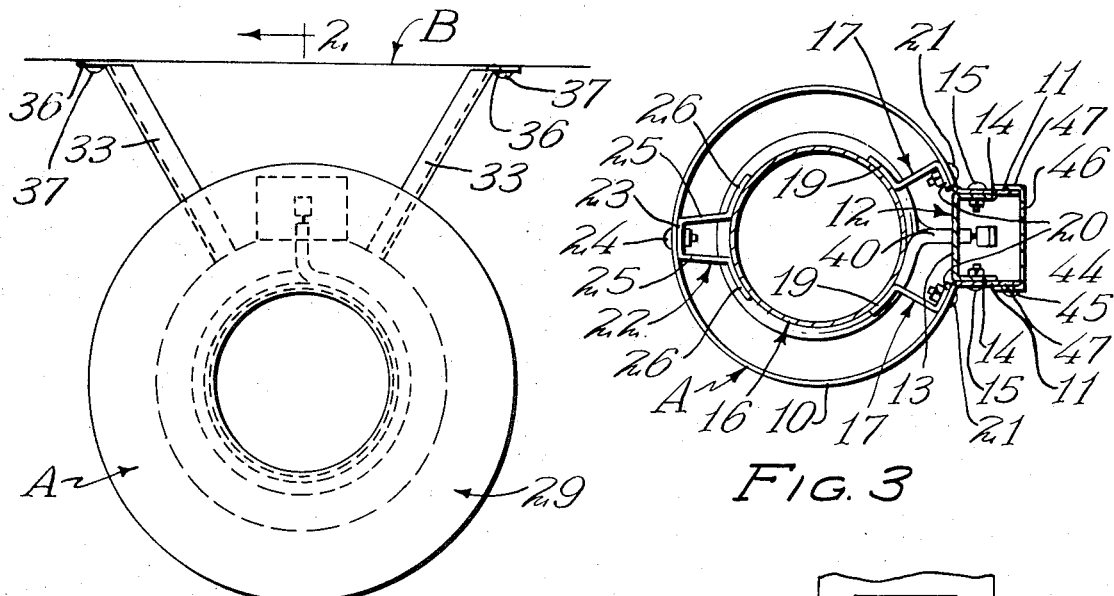
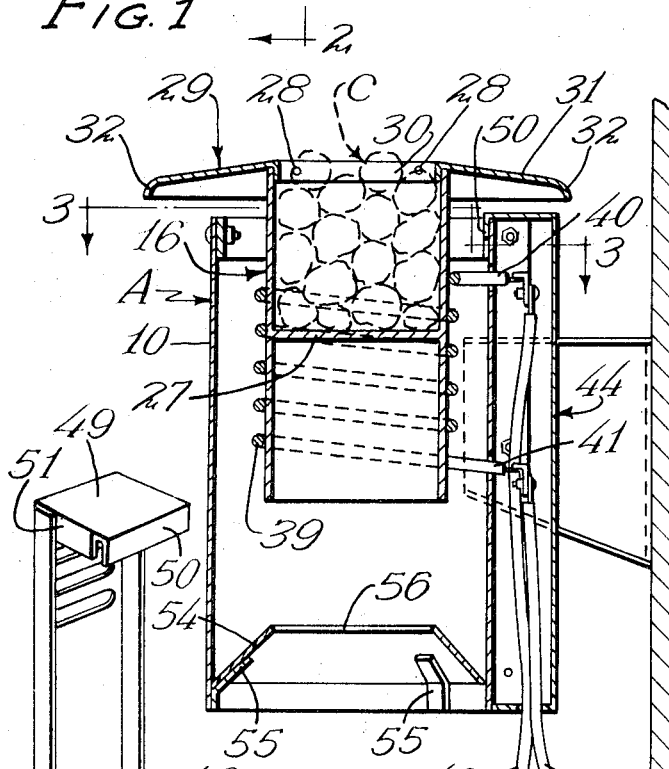
INVENTOR
JOHN LEO NEVILLE
ATTORNEY

ELECTRIC SAUNA HEATER

This invention relates to an improvement in electric sauna heater and deals particularly with an electrically operated heater unit designed to generate heat for use in sauna bathrooms and the like.

During recent years the production of sauna baths has greatly increased. The heaters for these baths vary quite considerably in form and design. It is the purpose of the present invention to provide a unit which will provide heat in a very short period of time, and which may be employed to provide either dry heat or moist heat as desired.

A feature of the present invention resides in the provision of an electric sauna heater including an outer tubular shell, within which is an axially supported inner tubular shell. An electric heating element encircles the inner shell and creates sufficient heat to heat a sauna room to the desired above normal room temperature.

A feature of the present invention resides in the fact that the inner shell is provided with a partition wall which extends there across intermediate its ends. The portion of the inner shell above the partition serves as a receptacle which may be used to contain rocks or other heat sustaining materials which may serve to produce steam when water is introduced into this receptacle. If preferred, the heater may be used to produce a dry heat in the event no water is introduced into the rock receptacle.

A further feature of the present invention resides in the provision of a frusto-conical ring secured within the lower end of the outer tubular shell or sleeve which acts to direct incoming air toward the lower portion of the inner tubular shell or sleeve. The air in this lower closed portion of the inner shell is heated to a high temperature by a heating coil encircling the inner sleeve, and this high temperature air is gradually withdrawn by the circulation of incoming air into the inner tubular receptacle and between the inner and outer shells so that the air leaving the heater will issue at a high temperature.

A further feature of a present invention resides in the provision of a ring-shaped baffle plate secured to the upper end of the inner shell which extends outwardly well beyond the open upper end of the outer shell and spaced upwardly therefrom. As a result, air which is heated within the heater and moves upwardly within the same is deflected outwardly in all directions from the enclosure to diffuse the heated air within the room being heated.

An added feature of the present invention resides in the provision of a device of the type described in which air is drawn into the outer shell through the frusto-conical ring baffle at the lower end thereof and is directed toward the hollow lower end of the inner shell beneath the rock receptacle. Air is heated both within the lower end of the inner shell and between the inner and outer shells and in an area surrounding the same, and this heated air is diffused outwardly by the baffle plate at the upper end of the inner shell. At the same time, when moist heated air is also desired, water may be poured into the upper end of the rock receptacle, preferably upon rocks or other heat retaining bodies located therein which have been preheated to a high temperature. The moisture vapor and steam created by the water in the rock receptacle is mixed with the heated dry air rising between the inner and outer tubular shells to be circulated in the sauna room.

A further feature of the present invention resides in the provision of an electric sauna heater in which the terminals extend into a conduit externally of the outer tubular shell where the terminals are not in the direct path of moisture bearing air produced by the heater. Means is provided for mounting the device on the wall of the sauna room so that the air may flow freely through the lower end of the heating unit.

These and other objects and novel features of the present invention will be more clearly and fully set forth in the following specification and claims.

In the drawings forming a part of the specification:

FIG. 1 is a top plan view of the electric sauna heater, showing the general arrangement of parts therein.

FIG. 2 is a vertical sectional view through the sauna heater, the position of the section being indicated by the line 2—2 of FIG. 1.

FIG. 3 is a horizontal sectional view through the upper portion of the sauna heater, the position of the section being indicated by the line 3—3 of FIG. 2.

FIG. 4 is a rear elevational view of the heater, portions of the mounting brackets being broken away.

FIG. 5 is a perspective view of the electrical conduit used to support the electrical wires.

The sauna unit is indicated in general by the letter A. The sauna includes a generally cylindrical arcuate outer body shell 10 which terminates in two spaced parallel flanges 11 which are equally spaced from, and are parallel to, a radial plane through the axis of the shell. The inner wall of the shell is completed by a channel 12 including a base portion 14 which extends along a chord of the outer shell, and parallel sides 14 which are bolted to the inner surfaces of the parallel flanges 11 as indicated at 15.

An inner cylindrical shell 16 is supported coaxially with the outer shell 10. Substantially Z-shaped brackets 17 have one end 19 welded or otherwise fixed to the outer surface of the inner shell 16, and include outer flanges 20 which are bolted to the outer shell as indicated at 21. The Z-shaped brackets 17 are arranged on opposite sides of the out-turned flanges 11. Diametrically opposite the center line between the brackets 17, a U-shaped bracket 22 is provided having a base portion 23 which is bolted with inwardly extending sides 25 which terminate in out-turned flanges 26 welded or otherwise affixed to the outer surface of the inner shell 16. The two Z-shaped brackets 17 combine with the opposed U-shaped bracket 22 to hold the inner receptacle or shell 16 in coaxial relation with the outer shell 10.

A partition wall 27 extends across the inner tubular member 16, the partition wall being normal to the axis of the inner tubular member. The inner shell 16 extends above the level of the outer shell 10. A baffle or deflector 29 is mounted upon the upper extremity of the inner shell 16 in spaced relation above the open upper end of the outer tubular member 10. The baffle 29 includes a generally tubular sleeve 30 which fits within the tubular upper end of the inner receptacle 16, and is secured thereto by bolts 28 or other suitable means and a downwardly and outwardly inclined deflecting ring 31 which terminates in a downwardly turned flange 32. The ring-shaped member 31 is of substantially greater diameter than the outer shell 10, and overlies the open upper end thereof so as to deflect heated air issuing from the upper end of the outer sleeve 10 outwardly and downwardly.

A pair of brackets 33 of channel shaped cross-section have flanged ends 34 bolted or otherwise secured to the outer shell 10 as indicated at 35, (See FIG. 4). As indicated in FIG. 1 of the drawings, the brackets 33 have outwardly turned end extremities 36 which extend on a common plane and which may be bolted to a supporting wall B or other supporting surface by screws 37 or other suitable fastening means.

A heating element 39 closely encircles the inner heat conductive shell 16 and includes parallel radially extending ends 40 and 41 which extend through the base 13 of the channel 12. The ends 40 and 41 of the heating element 39 are connected by suitable conductors 42 and 43 to a suitable source of current supply.

A channel 44 is secured to one of the flanges 11 by a bolt or similar means 45. As best illustrated in FIGS. 3 and 5, the channel includes a base portion 46 which forms an enclosure for the rear edges of the flanges 11, and includes parallel flanges 47 which are arranged in face contact with the end edges of the flanges 11. The member 44 also includes a top panel 49 which forms a top for the area between the flanges 11, and a flange 50 which hooks over the upper end of the channel 12 so as to hold the cover 44 in place as seen in FIG. 2. Side flanges 51 along the edges of the cover flange 49 extend over the upper edges of the flanges 11 for further securing the member 44 in place. The lower end of the channel formed by the flanges 11 is closed by a closure plate 52 which is apertured as indicated at 53 to accommodate the conductors 42 and 43. The member 44 merely forms a removable enclosure for covering the connections between the conductors and the heating element 39.

The lower end of the outer tubular member 10 is provided with a frusto-conical baffle 54 which has its large diameter end in contact with the inner surface of the outer sleeve 10. The frusto conical member 54 is held in place by angular clips 55 which are welded to the baffle and to the inner surface of the outer tubular member 10. The apertured open end 56 of the baffle 54 is designed to direct air toward the lower end of the inner tubular sleeve 16 beneath the baffle 27.

When the conductors 42 and 43 are connected to a source of current, the heating element 39 is heated to a high temperature, and similarly heats the heat conductive inner tubular member 16 due to its direct contact therewith. Rocks C or other heat retaining members may be placed in the receptacle above the partition 27, and when these rocks are heated, water may be poured on them to produce moist air and steam.

The air entering through the frusto-conical baffle 54 is directed toward the inside of the inner tubular member 16 beneath the partition 27. Here the air is heated to a high temperature, and the circulation of air causes the trapped air to flow through the open lower end of the inner tubular member and upwardly between the inner and outer receptacles. This air is then deflected outwardly in a generally lateral direction by the ring-shaped baffle 29.

Thus it will be seen that air which is heated to a high degree of temperature is combined with moisture laden air or steam when water is introduced into the upper end of the inner receptacle. If the device is designed to provide merely dry heat, this may also be accomplished by omitting the water from the inner receptacle.

I have described the principles of construction and operation of my improvement in electric sauna heater, and while I have endeavored to set forth the best embodiment thereof, I desire to have it understood that changes may be made within the scope of the following claims without departing from the spirit of my invention.

I claim:

1. An electric sauna heater including:
   an outer tubular shell having open ends,
   an imperforate inner tubular shell of heat conductive material secured concentric with and within said outer shell and spaced therefrom,
   a heating element encircling the major portion of the length of said inner shell in contact therewith, said element being enclosed within, and spaced from, said outer shell,
   a partition wall extending across said inner shell spaced from the ends thereof, said wall providing a rock receptacle within said shell above said partition wall, and an open bottomed air chamber within said shell below said partition wall,
   and a ring-shaped baffle of generally frustoconical shape secured to said outer shell at the lower end thereof and inclining upwardly toward the open upper end to direct air toward the air chamber in the lower end of said inner shell.

2. The structure of claim 1 and including a ring-shaped baffle encircling, and secured to, the upper end of said inner shell, said baffle being of larger diameter than said outer shell and extending over the upper end of said outer shell in spaced relation thereto.

3. The structure of claim 1 and in which said heating element comprises an elongated member and including a tubular chamber externally of said outer shell into which the ends of said heating element extend.

4. The structure of claim 1 and in which said heating element extends spirally around said inner shell.

* * * * *